E. J. CUNNINGHAM.
LOOSE PULLEY.
APPLICATION FILED AUG. 11, 1910.
1,007,071.
Patented Oct. 31, 1911.
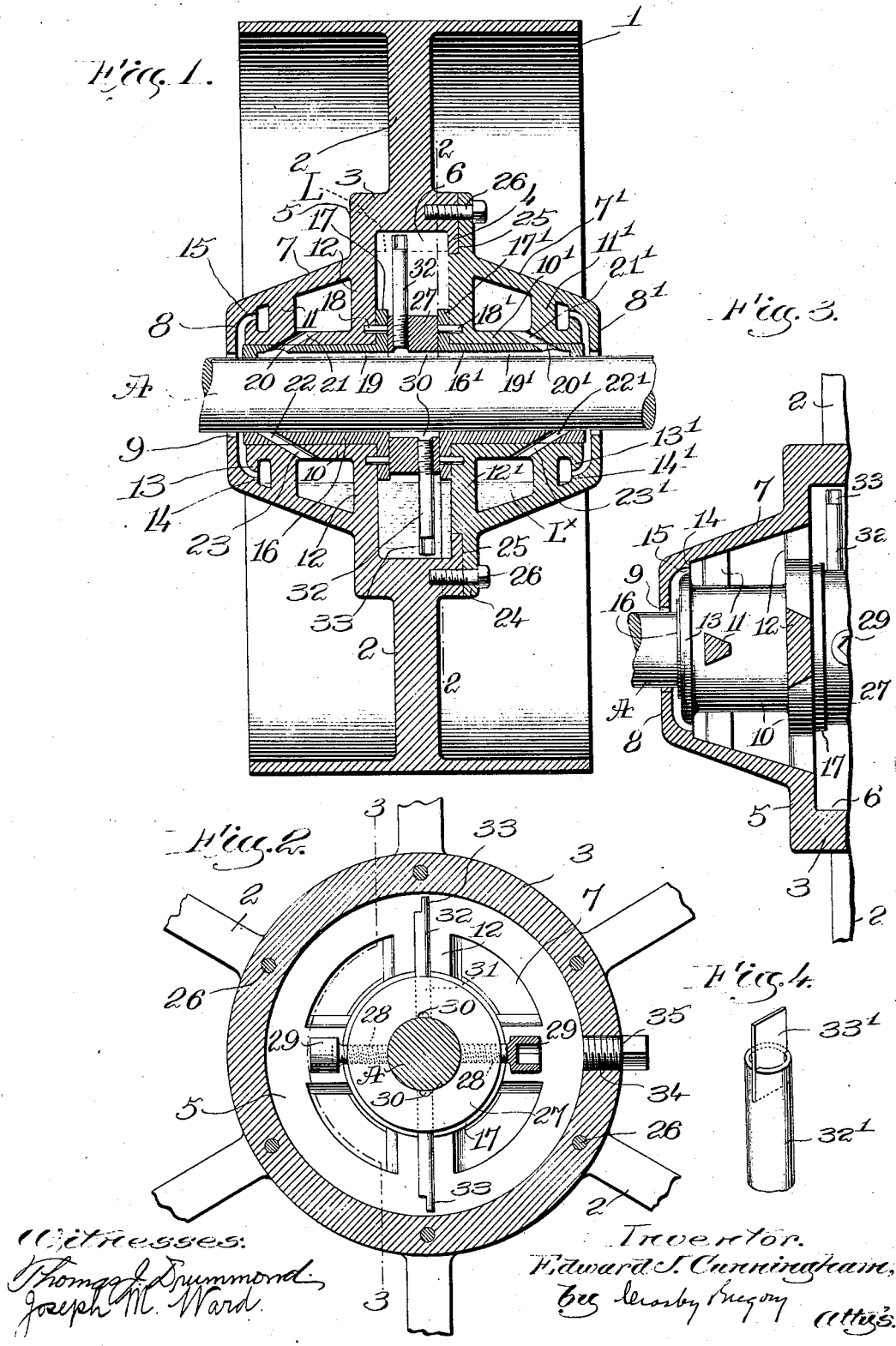

UNITED STATES PATENT OFFICE.

EDWARD J. CUNNINGHAM, OF CANTON, MASSACHUSETTS.

LOOSE PULLEY.

1,007,071.  Specification of Letters Patent.  Patented Oct. 31, 1911.

Application filed August 11, 1910. Serial No. 576,644.

*To all whom it may concern:*

Be it known that I, EDWARD J. CUNNINGHAM, a citizen of the United States, and resident of Canton, county of Norfolk, State of Massachusetts, have invented an Improvement in Loose Pulleys, of which the following description, in connection with the accompanying drawing, is a specification, like characters on the drawing representing like parts.

This invention relates to loose pulleys of the type provided with means to contain a supply of oil or other lubricant and to convey the same constantly to the shaft upon which the pulley is rotatably mounted.

My invention has for its principal objects the provision of efficient means for containing the main body of lubricant and obviating leakage thereof when the pulley is running at speed, to improve the feeding means whereby the lubricant is conveyed from the main body thereof to the parts of the structure requiring lubrication; to provide for the prompt return of surplus lubricant from the lubricated parts to the main body of lubricant, and to provide effective and simple means for preventing any escape of oil from the ends of the hub portion of the pulley. These and other novel features of my invention will be fully described in the subjoined specification and particularly pointed out in the following claims.

Figure 1 is a vertical sectional view of a pulley embodying my present invention, taken through the axis thereof, the shaft on which the pulley is mounted being shown in elevation, and the pulley is supposed to be at rest. Fig. 2 is a section taken on the line 2—2, Fig. 1, looking toward the left, to show certain novel features more clearly; Fig. 3 is a sectional view taken on the irregular line 3—3, Fig. 2, looking toward the right, illustrating the peculiar shape in cross-section of the arms connecting the hub and the surrounding case or shell; Fig. 4 is a perspective detail, on an enlarged scale, of a modified form of lubricant-collecting and conveying member, to be referred to.

In the present embodiment of my invention the pulley is made in two principal sections, the main section comprising an annular belt flange 1 connected by suitable spokes 2 with a concentric interior ring 3 having parallel inturned flanges 4, 5 which latter, with the inner circumference of the ring, form a trough-like annular chamber 6. The flange 5 is continued laterally to form an outwardly tapered or conical casing or shell 7 having its outer end closed by a head 8 apertured at 9 to loosely embrace the shaft A upon which the pulley as a whole is rotatably mounted. A hub member 10 is rigidly connected with the casing or shell 7 by radial arms 11 and 12, the outer end of said hub member having an annular, radial lip 13 thereon, for a purpose to be described, said lip being located within and opposite to an annular shoulder 14 on the interior of the shell. The said shoulder and the inner face of the lip are shown in Fig. 1 as lying in a common plane intersecting the axis of rotation of the pulley at right angles thereto, a clearance between the outer end of the hub and the inner face of the head 8 communicating throughout its extent with the annular clearance 15 between the lip and the shoulder referred to. A removable bushing 16 is inserted with a snug fit in the hub member and is positioned therein by a flange 17 on the inner end of said bushing, which flange rests against the inner end of the hub member and is caused to rotate therewith by pins 18 extended from the hub into the flange. The bushing surrounds and rotates upon the shaft A when the pulley is in motion, and takes the wear, so that by renewing the bushing whenever necessary the pulley can be made to last an indefinite time. A longitudinal groove 19 in the bore of the bushing extends from its inner end to a point near its outer end, as clearly shown in Fig. 1, to distribute lubricant to the surface of the shaft. Near the closed outer end of said groove a duct 20 in the bushing registers with a duct 21 traversing the hub and opening into the tapered shell 7, and as these ducts are for the return of the lubricant to the shell I prefer to make them diagonal, as shown, the inclination thereof being toward the chamber 6.

The coöperating complementary section of the pulley will now be described, and for convenience the numerals of similar parts of the main section will be employed, but primed. The complemental shell or casing 7′ is made conical or tapered outward, and is closed at its outer end by the head 8', radial arms 11' and 12' connecting the shell with the complemental hub member 10', the latter having an annular, radial lip 13' opposite an annular shoulder 14' on the interior of the shell. The complemental bushing 16' having at its inner end the annular flange 17' is connected by pins 18' with the hub member 10', to rotate therewith, and the longitudinal distributing groove 19' in the bore of said bushing 10' is alined with the groove 19 of the bushing 16, as shown in Fig. 1. Registering diagonal ducts 20', 21' serve to return the lubricant from the closed outer end of the groove 19' to the interior of the shell 7', and additional return ducts 22, 23 and 22', 23' are shown in Fig. 1 formed in the hub members and bushings, and diametrically opposite the first-named ducts. The inner end of the shell 7' is provided with an external annular flange 24 having a peripheral diameter equal to that of the ring 3, said flange having an annular rabbet or seat 25 formed in its inner face to receive the flange 4 on said ring, as shown in Fig. 1, making a tight joint thereat, and bolts 26 passed through flange 24 into the ring 3 rigidly and securely connect the main and complemental sections of the pulley.

It will be understood that when the pulley is running at speed centrifugal action will cause the oil or other lubricant to dispose itself in the annular trough-like chamber 6, and this annular body of lubricant revolves with the pulley. At high speeds the centrifugal action will tend to force the lubricant through any straight faced joint submerged thereby, and in order to prevent any leakage from this cause I make the flange 4 of such depth that the lateral joint between its circumferential face and the opposed face of the seat 25 will not be submerged by the body of lubricant.

Referring to Fig. 1 the broken line L indicates the inner circumference of the body of lubricant when the pulley is running at speed, and it will be noted that it is radially beyond the lateral joint referred to. Consequently the outward pressure of the lubricant is resisted by the integral walls and bottom of the chamber 6, that is, by the flanges 4 and 5 and the integral connecting ring 3, so that there cannot be any leakage of lubricant at such part of the device, the fastening bolts 26 also being located radially beyond the bottom and side walls of the chamber 6, as shown in Fig. 1.

I regard this construction as a very important feature of my invention, because without ground joints or other expensive construction it is impossible to prevent forcing of the lubricant through a submerged joint when the pulley is running at sufficient speed to generate any material centrifugal force.

When the pulley is running at low speed the lubricant will collect more or less in the interior of the shells and the hub members as at L$x$, Fig. 1, and the annular lips 13, 13', on the outer ends of said members prevent escape of the lubricant onto the shaft at the ends of the hub, while the shoulders 14, 14' perform a similar function for the interior surfaces of the tapered shells. Any small portion of lubricant which works out onto the ends of the hub will be carried back by centrifugal action through the clearance spaces between the hub lips and the surrounding shoulders on the shell portions of the pulley, into the interior of the shell, and returned to the chamber 6.

I will now describe the means for conveying or feeding the lubricant from the said chamber to the alined distributing grooves 19, 19' in the bushings. A collar 27 is fixedly secured to the shaft A by set-screws 28, shown herein as having socketed heads 29, the collar being of such thickness as to fit easily between the opposed flanges 17 and 17' of the two bushings and preventing any axial movement of the pulley, it being understood that the collar is positioned between the inner ends of the hub members before the two pulley sections are bolted together. Said collar has its bore provided with one or more axial grooves 30, two being herein shown, which will be brought intermittingly into alinement with the alined grooves 19, 19' as either the shaft or the pulley is revolved. A radial hole 31 in the collar intersects each groove 30, and into the hole is fixed, as by screw threading, a tubular feeder 32 extended radially beyond the collar and long enough to enter the chamber 6 and closely approach the circular bottom thereof. The outer end of the feeder is shaped to present an abutment 33, and in the construction shown in Figs. 1, 2 and 3 this abutment is formed by cutting the feeder tube half way across and longitudinally, leaving the projecting abutment a segment.

I have shown two of the feeder tubes 32 in the present embodiment of my invention, extended from diametrically opposite portions of the collar, but laterally offset from each other, see Fig. 1, so as to travel in different paths through the body of lubricant in the chamber 6. Any suitable number of these tubular conveyers or feeders may be used, their function being to convey or feed the lubricant from the chamber 6 to the grooves 30, the lubricant passing thence to the alined grooves 19, 19' in the bushings. If the pulley is revolving the body of lubricant whirls around with it, and some of it will flow by gravity through a feeder or conveyer to the shaft, while other portions of the lubricant will be forced through, depending on the speed of the pulley, the position of the conveyer, etc.

I have shown the opposite abutments 33 as having their concave faces turned in the same direction, and this is to insure the circulation of the lubricant, irrespective of the direction in which the pulley is rotated. Pulleys are sent out with instructions as to the proper direction of rotation, but through carelessness they are often put on the shaft to rotate in the opposite direction to that for which they were designed.

Referring to Fig. 2 it will be seen that if the pulley is rotated from left to right the lubricant will impinge upon the upper feeder abutment and will thereby be deflected and carried downward to the shaft, while the lower abutment and tubular conveyer or feeder will be practically inactive. Rotation of the pulley from right to left, however, brings the lower feeder abutment into action and the lubricant will be forced upward through the conveyer to the shaft. In the first case the action of gravity will assist the flow of lubricant, while in the second case the flow will be against gravity, but in both cases the lubricant will be conveyed surely and with certainty from the main body thereof to the shaft. The faster the pulley revolves the more forcibly will the lubricant be caused to travel to the distributing grooves and thence onto the shaft, and the return of the lubricant to the shells and thence to chamber 6 will be correspondingly rapid. By offsetting the abutments and the tubular conveyers or feeders I secure a better action and more complete control of the lubricant. It will be manifest that if the united action of a plurality of feeders is desired it is only necessary to turn them so that each one will present its deflecting face to the moving body of lubricant.

A modification is shown in Fig. 4, wherein the tubular feeder 32′ is slitted diametrically at its outer end, and a flat abutment 33′ is fixed in the slits, so that either face will act as a deflector, and the lubricant will flow from such face into and through the feeder. Using this modified form a single feeder or conveyer could be connected with the collar 27, and would operate irrespective of the direction of rotation of the pulley.

Referring to Figs. 2 and 3 the radial arms connecting the hub members and their shells are shown as having oppositely beveled side faces, the sides converging toward the central plane of the pulley. This construction is to cause the lubricant to be thrown inward as such arms travel through the body of lubricant when the pulley is moving faster than the body, such inward movement of the lubricant tending to keep it away from the outer ends of the hub members and to direct it toward the chamber 6. The lubricant is stored in such chamber, and is drawn or fed therefrom by the feeding or conveying means to the shaft and distributed over the surface thereof by the distributing grooves in the two-part bushing, and when the pulley is rotated at speed manifestly there is practically a force-feed to conduct the lubricant from the peripheral portion of the shell to the shaft. A threaded hole 34, Fig. 2, is made in the ring 3, and under normal conditions said hole is closed fluid tight by a screw-plug 35, but by removing the latter a suitable tool can be inserted to coöperate with the socketed heads of the set-screws 28 and set up or loosen the same when any manipulation of the collar 27 is necessary. When the pulley is rotating at speed there is a continuous circulation of the lubricant from the main body to the shaft, through the distributing grooves or channels, and thence by the diagonal return ducts the lubricant is carried into the shells and directed to the main body in the annular chamber.

Various changes or modifications in details of construction may be made by those skilled in the art without departing from the spirit and scope of my invention as set forth in the claims annexed hereto.

Having fully described my invention, what I claim as new and desire to secure by Letters Patent is:—

1. A loose pulley for shafts, comprising an annular belt-flange, an interior trough-like annular lubricant-chamber having a circular bottom and integral side walls, laterally separated hub members, a bushing in each provided with a longitudinal groove communicating throughout its length with the shaft to distribute lubricant thereto, outwardly tapered shells connected with the side walls of said chamber and surrounding the hub members, a collar fixed on the shaft between the said members and having its bore longitudinally grooved, to be brought intermittingly in alinement with the longitudinal grooves of the bushings, a tubular feeder mounted radially on said collar and extended into the lubricant-chamber, the inner end of the feeder communicating with the grooved bore of the collar, to convey lubricant thereto from said chamber, and an abutment on the outer end of the feeder to direct the lubricant into the adjacent end of the feeder.

2. A loose pulley for shafts, comprising complemental sections one of which has an annular belt flange, a concentric, thick interior ring having inwardly extended integral annular flanges, to form an annular lubricant-chamber, a tapered shell forming a continuation of one of said flanges, and an attached hub member, the other section having a hub member, an attached tapered shell having an annular, external flange at its inner end and provided on its inner face with an annular seat for the adjacent flange on the ring of the first-named section, the joint formed by said seat and the flange entering the same being located between the axial center of the pulley and the inner surface of the body of lubricant in the annular chamber, and connecting bolts for the sections, passing through the flange having the seat and into the side of the ring adjacent thereto.

In testimony whereof, I have signed my name to this specification, in the presence of two subscribing witnesses.

EDWARD J. CUNNINGHAM.

Witnesses:
JOHN C. EDWARDS,
THOMAS J. DRUMMOND.